United States Patent [19]
Kodaira et al.

[11] Patent Number: 6,067,148
[45] Date of Patent: May 23, 2000

[54] EXECUTION HEIGHT DISPLAY DEVICE AND EXECUTION HEIGHT SETTING SYSTEM

[75] Inventors: Jun-ichi Kodaira; Takaaki Yamazaki, both of Tokyo, Japan

[73] Assignee: Kabushiki Kaisha Topcon, Tokyo, Japan

[21] Appl. No.: 09/146,320

[22] Filed: Sep. 3, 1998

[30] Foreign Application Priority Data

Sep. 18, 1997 [JP] Japan ........................... 9-253387

[51] Int. Cl.[7] ................... G01C 3/08; G01C 5/00
[52] U.S. Cl. ........................... 356/4.08; 356/3.07
[58] Field of Search ................... 356/3.07, 4.08

[56] References Cited

U.S. PATENT DOCUMENTS 4,029,415  6/1977  Johnson .
4,062,634  12/1977  Rando et al. .
4,600,997  7/1986  Cain et al. .
4,756,617  7/1988  Cain et al. .

*Primary Examiner*—Stephen C. Buczinski
*Attorney, Agent, or Firm*—Jacobson, Price, Holman & Stern, PLLC

[57] ABSTRACT

An execution height setting system 100 includes laser device 102 for setting a horizontal reference plane by rotatably radiating a laser beam and a execution height display device 104. The execution height display device 104 has a light receiving section 112 for receiving the laser beam, an indexing section 118 for indicating a shift of the sensed laser beam relative to the reference position, and a data display section 108 for displaying the inputted grade or execution height. As the execution height display device 104 receives the laser beam, it senses the distance between the laser device 102 and the execution height display device 104 and then computes the desired execution height based on the set grade value. The computation result for the execution height is displayed on the execution height display portion 108c.

28 Claims, 16 Drawing Sheets

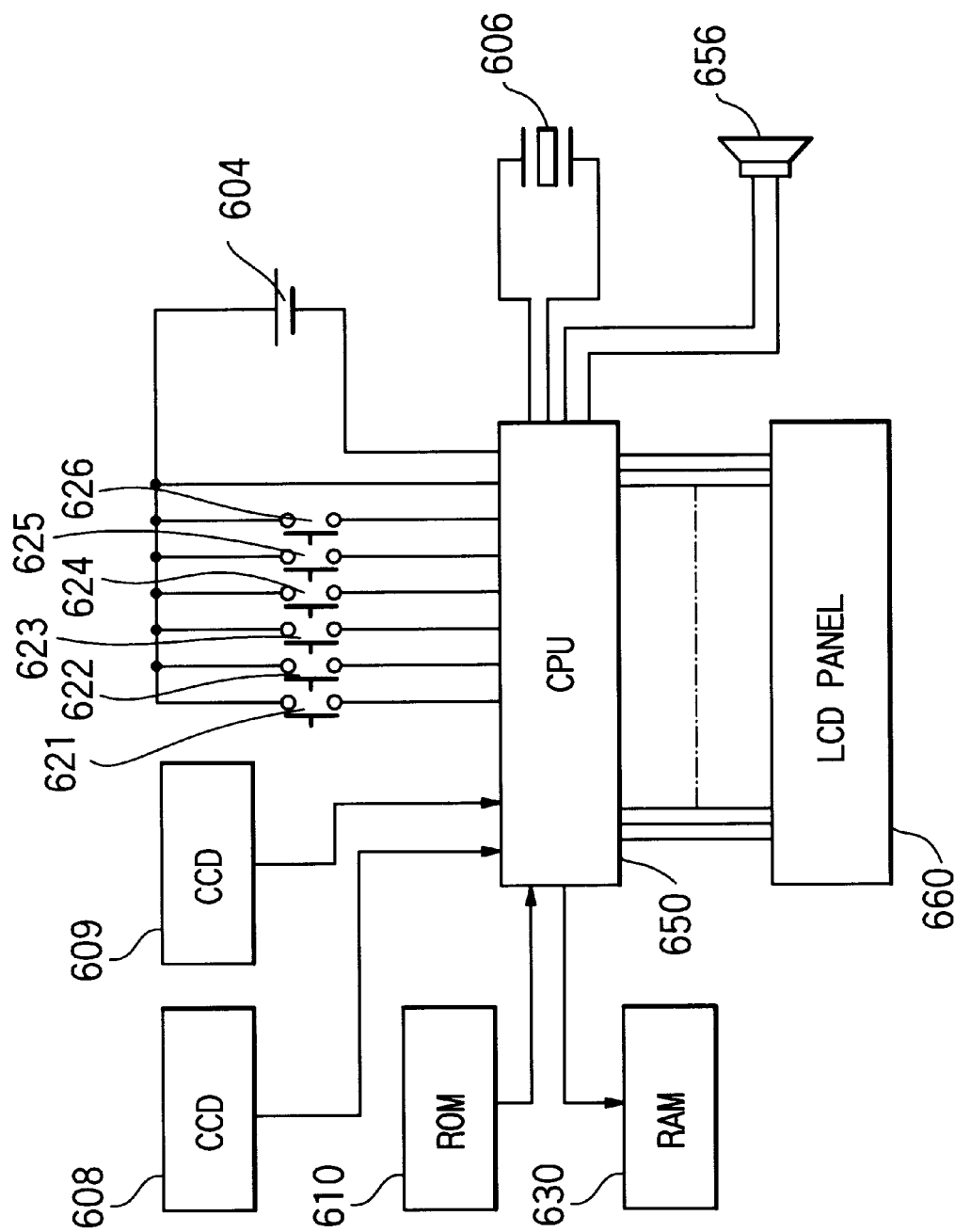

EXECUTION HEIGHT DISPLAY DEVICE AND EXECUTION HEIGHT SETTING SYSTEM

BACKGROUND OF THE INVENTION

The present invention relates to a execution height display device for receiving a laser beam and displaying an execution height and a execution height setting system comprising such a execution height display device and a laser device.

In the site of execution for buildings, constructions and so on, the survey had been made by using a surveying machine such as level, transit or the like when a building graded from the reference position was to be executed. The survey involved a finishing stake used as a reference to execute buildings or the like along the finishing stake.

In such a case, further, a rotary laser, pipe laser or the like might be used so that the laser beam emitted therefrom was inclined relative to the horizontal plane to execute a graded building or the like along the inclined laser beam.

The above mentioned prior art required a large amount of labor and time to set the survey and staking by the use of the surveying machine such as level, transit or the like. In addition, a machine for emitting a laser beam required a sloping mechanism, leading to the complicated structure thereof.

In order to overcome the above mentioned problems in the grade setting device of the prior art, an object of the present invention is to provide an execution height display device and execution height setting system each having a simplified structure which can greatly reduce time required to set the survey and staking so that an operation of executing a building or the like graded from the reference position will efficiently be performed.

SUMMARY OF THE INVENTION

To this end, the present invention provides an execution height setting system comprising a laser device for rotatably radiating a laser beam onto a reference plane and a execution height display device for receiving the laser beam from the laser device to compute the distance between the laser device and the reference plane and for displaying the height of a building or the like to be executed based on the computation result.

The execution height display device comprises a light receiving section for receiving the laser beam from the laser device and a distance computing circuit for computing the distance between the laser device and the light receiving section based on the output signal from the light receiving section.

The execution height display device also comprises a grade setting input member for inputting an execution grade relative to the laser device and a height computing circuit for computing an execution height based on the grade setting inputted into the grade setting input member and also the output signal from the distance computing circuit. The execution height display device further comprises a height display section for displaying the execution height based on the output signal form the height computing circuit.

In such an arrangement, an operation of executing a building or the like graded from the reference position can efficiently be made.

In the execution height setting system of the present invention, it is preferred that the laser device comprises a laser beam modulating circuit for modulating the laser beam and that the execution height display device comprises a pulse counting circuit for counting the number of pulses in the laser beam based on the output signal from the light receiving section and a distance computing circuit for computing the distance between the laser device and the light receiving section based on the output signal from the pulse counting circuit.

In such an arrangement, the distance between the laser device and the execution height display device can very accurately be measured.

It is further preferred that the execution height display device comprises a light reception time measuring circuit for measuring time for which the execution height display device has received the laser beam, based on the output signal from the light receiving section, and a distance computing circuit for computing the distance between the light receiving section and the laser device based on the output signal from the light reception time measuring circuit.

In such an arrangement, the distance between the laser device and the execution height display device can accurately be measured.

It is further preferred according to the present invention that the execution height display device comprises a light reception state display section for displaying a position at which the laser beam enters relative to the reference position of the light receiving section and an indexing section having an index representing a shift of the laser beam from the reference position.

In such an arrangement, the position of the execution height display device can simply be aligned with the laser beam.

It is further preferred according to the present invention that the execution height display device comprises a light reception state display section for displaying a position at which the laser beam enters relative to the reference position of the light receiving section, an indexing section having an index representing a position based on the reference position, the indexing section being slidably mounted on the execution height display device, and index sensing means for sensing a position into which the indexing section has slidably moved.

In such an arrangement, the position of the execution height display device can very accurately be aligned with the laser beam in a simplified manner.

BRIEF DESCRIPTION OF THE DRAWINGS

FIG. 22 is a block diagram of the execution height display device according to the present invention.

DETAILED DESCRIPTION OF THE PREFERRED EMBODIMENTS

Some embodiments of the present invention will now be described with reference to the drawings.

(1) First Embodiment

Figure 2:
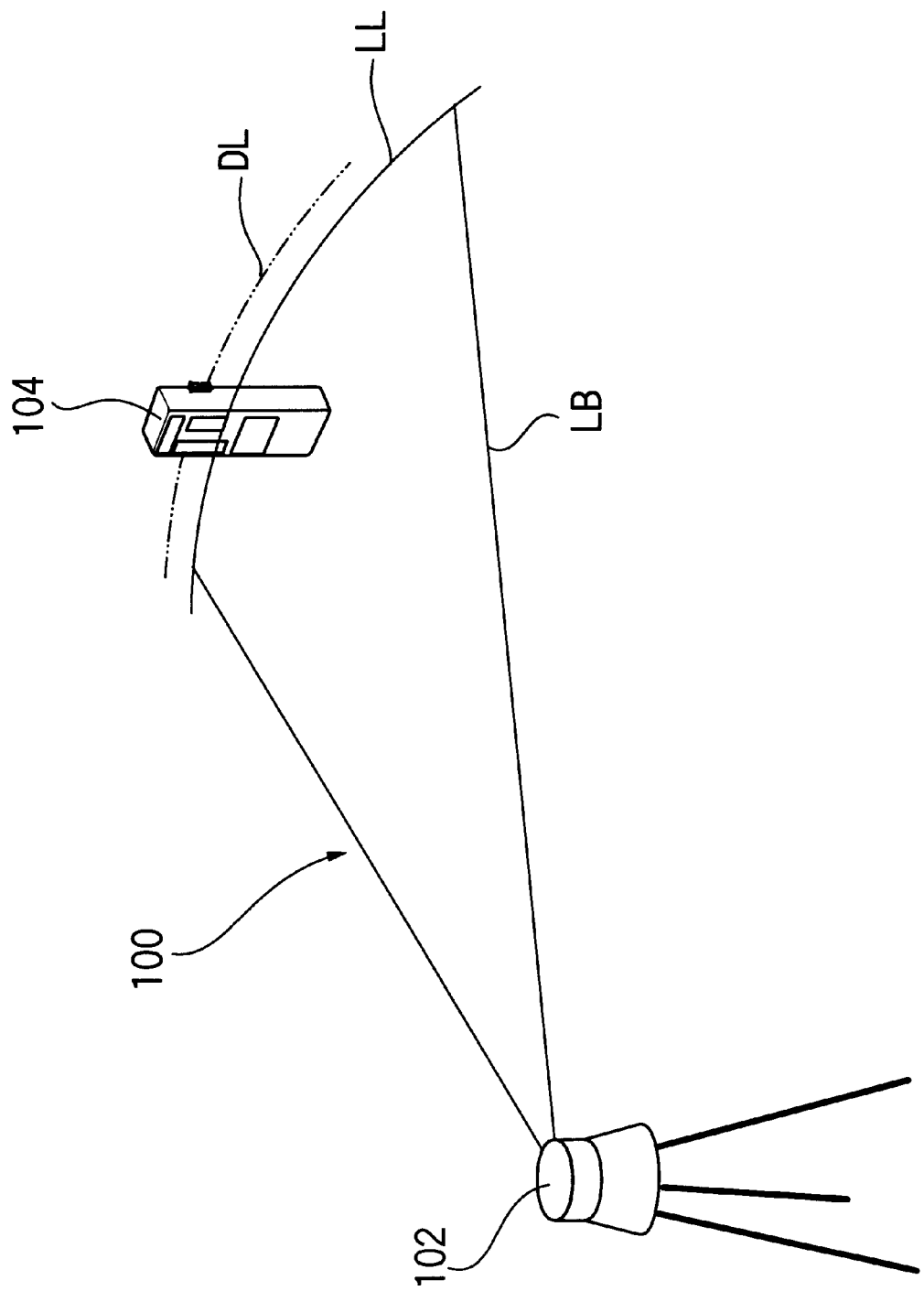
FIG. 2 is a view illustrating the execution height setting system of the present invention.
Figure 3:
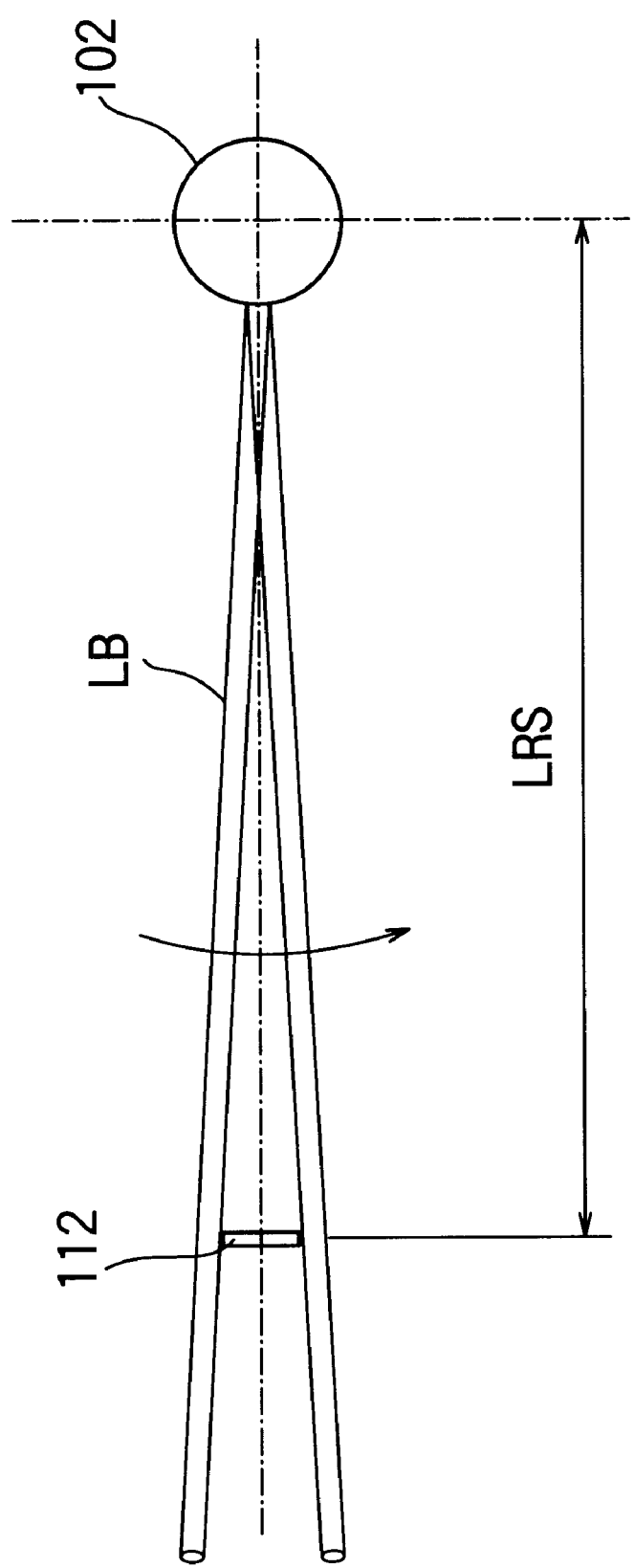
FIG. 3 is a view illustrating such a state that a laser beam emitted from a laser device according to the first embodiment of the present invention radiates a light receiving section.

In an execution height setting system 100 according to the first embodiment of the present invention, as shown in FIG. 2, a horizontal laser beam LB is rotated about a given vertical axis to set a laser device 102 for setting a horizontal reference plane. An execution height display device 104 is disposed, for example, on a wall (not shown) within a region reached by the laser beam LB. Letters LL denotes a line on the wall which is radiated by the laser beam LB; and DL a reference line which is to be offset from the radiated line LL by a given amount.

Figure 1:
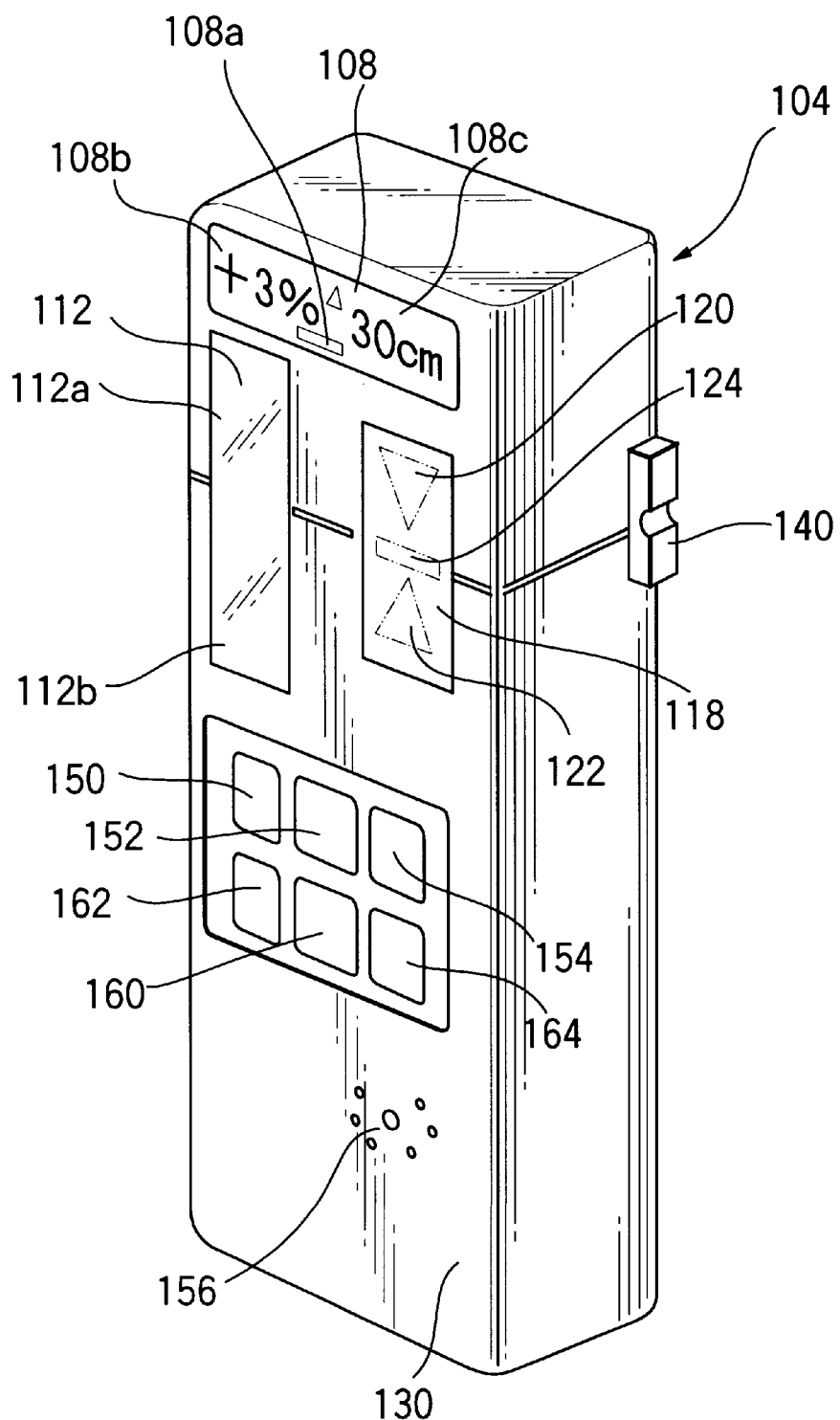
FIG. 1 is a perspective view of an execution height display device constructed according to the first embodiment of the present invention.

As shown in FIG. 1, the execution height display device 104 comprises a light receiving section 112 disposed with the light sensing surface thereof being perpendicular to the laser beam LB, an indexing section 118 for showing a shift of the sensed laser beam LB relative to the reference position and a data display section 108 for displaying an inputted grade or an execution height. The indexing and data display sections 118, 108 may be formed of a liquid crystal panel or LED, for example.

The light receiving section 112 may be formed of CCD which is divided into two portions, an upper light receiving portion 112a and a lower light receiving portion 112b. When the laser beam LB from the laser device scans the mid area between the upper light receiving portion 112a and the lower light receiving portion 112b in the light receiving section 112, it will radiate the reference position. At this time, a reference position indicating part 124 will be displayed on in the indexing section 118. When the laser beam LB scans the upper light receiving portion 112a, an upward indicating part 122 will be displayed on in the indexing section 118 to instruct that the operator should upwardly move a main body 130 to take the reference position. When the laser beam LB scans the lower light receiving portion 112b, similarly, a downward indicating part 120 will be displayed on in the indexing section 118 to point that the operator should downwardly move the main body 130 to take the reference position.

If the light receiving section 112 is formed by a position sensor such as CCD or the like or a light receiving element having a special configuration, the detection of the reference position can be performed more precisely. In such a case, the position of the scanning laser beam LB can be determined by defining a given position of the light receiving section as a reference position.

As shown in FIG. 1, the execution height display device 104 comprises a power switch 150, a detection precision adjusting button 152, a warning buzzer on/off button 154 and a warning buzzer 156. The execution height display device 104 further comprises a display mode selection switch 160 and first and second input switches 162, 164.

The aforementioned execution height display device 104 is movable up and down on the wall (not shown) in the main body 130 to align the laser beam LB with the reference position (not shown) on the light receiving section 112. When the laser beam LB is above the reference position on the light receiving section 112, the upward indicating part 122 is displayed on to instruct that the main body 130 should upwardly be moved. When the laser beam LB is below the reference position on the light receiving section 112, the downward indicating part 122 is lighted on to point that the main body 130 should downwardly be moved. When the laser beam LB aligns with the reference position on the light receiving section 112, the reference position indicating part 123 is lighted on to instruct that the positional adjustment in the main body 130 has completed. If there is no setting for grade, that is, if the grade is equal to zero, any subsequent operation such as marking or the like will be performed by utilizing a notch 140.

If it is required to set the grade, the display mode selection switch 160 is actuated to set "grade input mode". Such a set mode is preferably displayed on a mode display portion 108a in the data display section 108. The first and second input switches 162, 164 are then actuated to input the necessary grade. As shown in FIG. 1, the set grade "+3%", is preferably displayed on a grade display part 108*b* in the data display section 108. The grade may be set with "%", "°" or the like. The grade is inputted with a positive value (+) for ascending grade and with a negative value (−) for descending grade.

For example, if a grade of "+3%" is inputted into the execution height display device 104, a height equal to 15 centimeters will be obtained at a distance spaced apart from the laser device 102 by 5 meters. The height will be 30 centimeters at a distance spaced apart from the laser device 102 by 10 meters. In other words, the vertical height from the horizontal laser beam emitted from the laser device 102 will be proportional to the distance from the laser device 102.

The distance from the laser device 102 is detected by the execution height display device 104 which in turn computes the grade from the previously set values. The computation result is then displayed on an execution height indicating part 108*c* in the data display section 108 of the execution height display device 104. Even if the execution height setting system is located at any one of different distances from the laser device 102, an execution can be performed with a given set grade according to the instruction from the execution height display device 104.

If it is wanted to determine a distance LRS between the laser device 102 and the execution height display device 104, the laser beam LB rotatably emitted from the laser device 102 is sensed by the light receiving section 112 in the execution height display device 104. Based on the rotational speed and diameter of the laser beam LB, the distance LRS between the laser device 102 and the execution height display device 104 is computed and determined.

Figure 4:
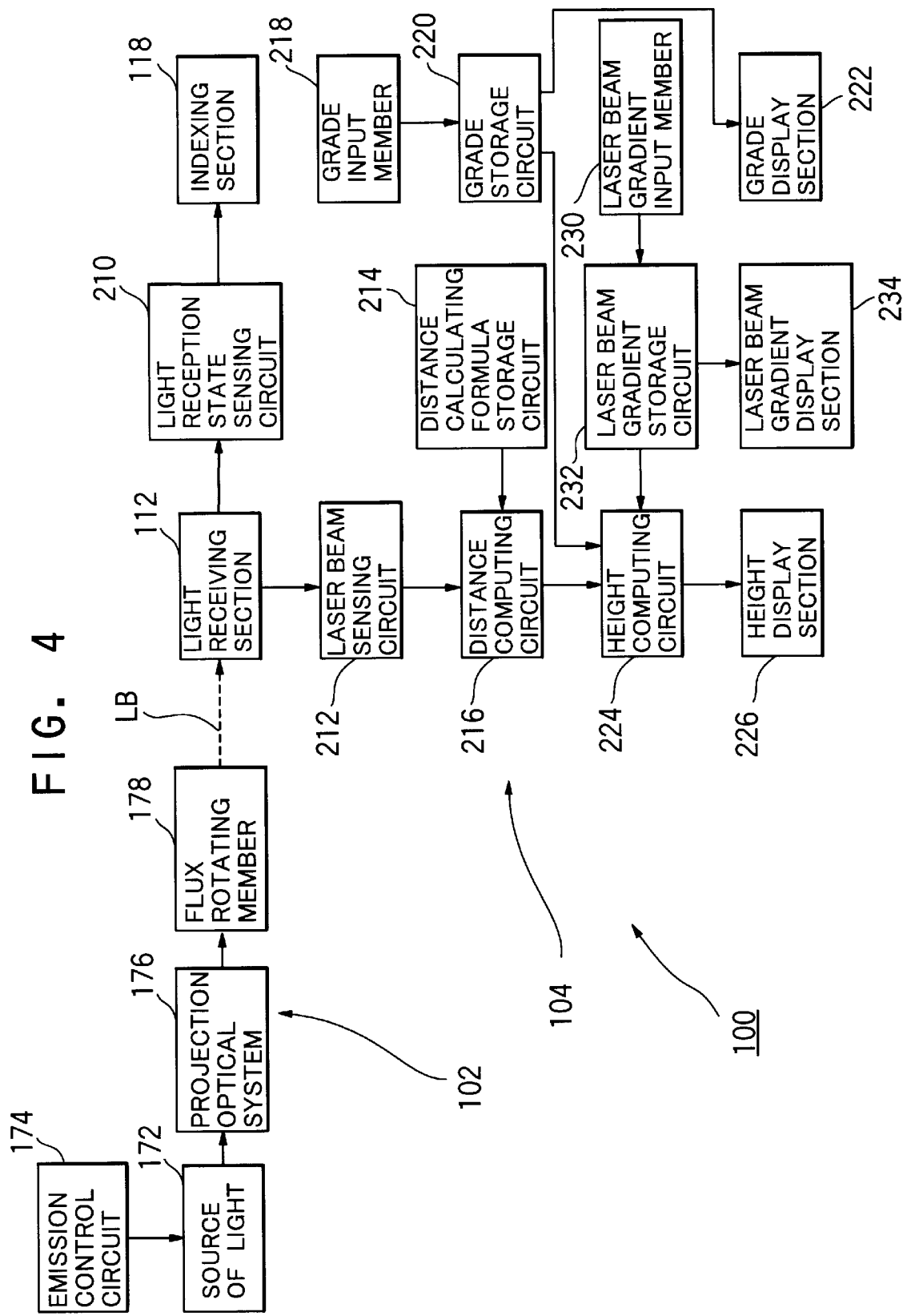
FIG. 4 is a block diagram of the laser device and execution height display device according to the first embodiment of the present invention.

Referring to FIG. 4, the laser device 102 comprises a source of light 172 for emitting the laser beam, an emission control circuit 174 for controlling the operation of the source 172, a projection optical system 176 for converging the laser beam into a luminous flux and a flux rotating means or member 178 for rotating the luminous flux of the laser beam. The laser beam emitted from the source 172 transmits through the projection optical system 176 to the flux rotating member 178 which in turn rotates the beam to form the laser beam LB. The laser beam LB is then emitted therefrom toward the light receiving section 112 at a constant rotational speed.

The execution height display device 104 comprises a light receiving section 112 for receiving the laser beam LB, a light reception state sensing circuit 210 for sensing the state of the received laser beam LB, an indexing section 118 for indicating the result of the sensed laser beam LB, a laser beam sensing circuit 212 for sensing the laser beam LB received by the light receiving section 112, a distance calculating formula storage circuit 214 previously stored a distance calculating formula for determining the distance LRS between the laser device 102 and the execution height display device 104, a distance computing circuit 216 for determining the distance LRS between the laser device 102 and the execution height display device 104 according to the distance calculating formula stored in the distance calculating formula storage circuit 214, based on the output signal from the laser beam sensing circuit 212, a grade input means or member 218 for inputting a grade required by the execution, a grade storage circuit 220 for storing the inputted grade based on the output signal from the grade input member 218, a grade display section 222 for displaying the content of grade stored in the grade storage circuit 220, a height computing circuit 224 for computing the height of a building or the like to be executed based on the output signal from the distance computing circuit 216 and also the content of grade stored in the grade storage circuit 220, and a height display section 226 for displaying the height of the building or the like to be executed based on the output signal form the height computing circuit 224.

As described, the indexing section 118 displays any one of the reference indicating part 124, upward indicating part 122 and downward indicating part 120, depending on the state of the received laser beam LB. The indexing section 118 may be formed by a liquid crystal panel or LED.

As described, the grade input member 218 comprises the display mode selection switch 160 and the first and second input switches 162, 164.

The execution height display device 104 preferably comprises a laser beam gradient input means or member 230 for inputting the gradient of the laser beam LB, a laser beam gradient storage circuit 232 for storing the inputted gradient of the laser beam LB and a laser beam gradient display section 234 for displaying the gradient of the laser beam LB stored in the laser beam gradient storage circuit 232. According to such a structure, the execution height display device 104 of the present invention may be applied to a case where the laser beam emitted from the laser device 102 is not horizontal.

As described, the laser beam gradient input member 230 comprises the display mode selection switch 160 and the first and second input switches 162, 164. It is preferable that the laser beam gradient input member 230 and the grade input member 218 are realized using the common parts by switching the operational mode from one to another.

A procedure of measuring time for which the laser beam LB is received by the light receiving section 112 by the use of the laser beam sensing circuit 212 will now be described.

The laser beam LB emitted from the laser device 102 is maintained constant in revolution, with the diameter thereof being also adjusted to be constant. However, the present invention may similarly be applied to a laser beam having its divergent angle. The width of the light receiving section 112 relative to the direction of the rotating laser beam LB is also predetermined.

Figure 5:
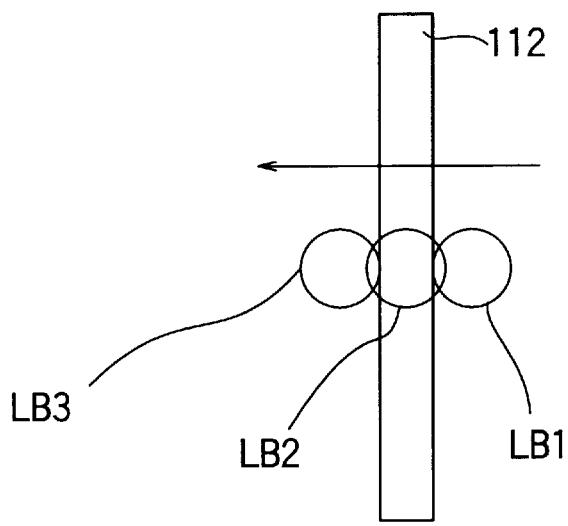
FIG. 5 is a side view showing the luminous flux of the laser beam which moves across the execution height display device according to the first embodiment of the present invention.

Referring to FIG. 5, the laser beam LB moving across the light receiving section 112 in the direction as shown by arrow first enters the light receiving section 112 in a state LB1, radiates the central and horizontal portion of the light receiving section 112 in another state LB2 and terminates the entry thereof onto the light receiving section 112 in still another state LB3.

Figure 6:
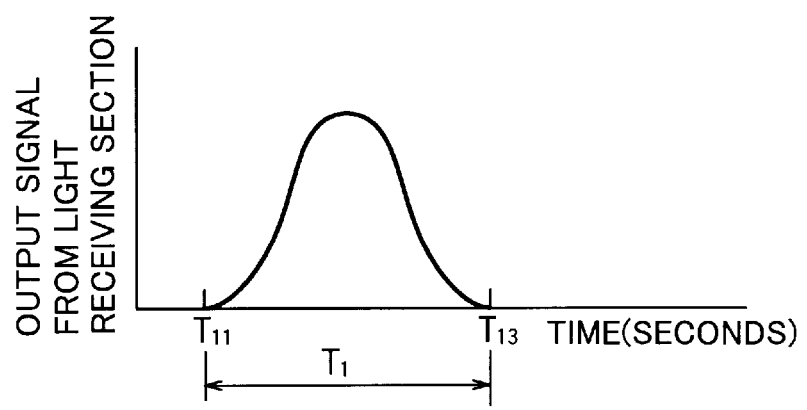
FIG. 6 is a view showing the output signal from the light receiving section of the execution height display device according to the first embodiment of the present invention.

Referring now to FIG. 6, the light receiving section 112 received the laser beam LB initiates to output a signal at time $T_{11}$ and terminates the output thereof at time $T_{13}$. The time interval $T_1$ between these times $T_{11}$ and $T_{13}$ is a light reception time for which the laser beam LB is received by the light receiving section 112.

Figure 7:
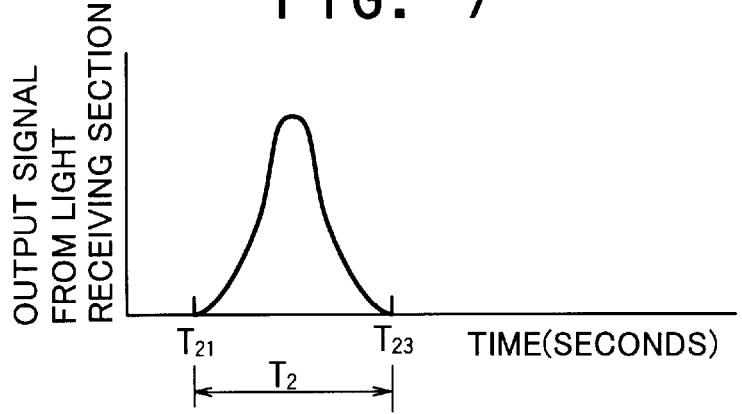
FIG. 7 is a view showing the output signal from the light receiving section of the execution height display device according to the first embodiment of the present invention.

Referring to FIG. 7, similarly, the light receiving section 112 received the laser beam LB initiates to output a signal at time $T_{21}$ and terminates the output thereof at time $T_{23}$. The time interval $T_2$ between these times $T_{21}$ and $T_{23}$ is a light reception time for which the laser beam LB is received by the light receiving section 112.

When $T_1$ is larger than $T_2$, it means that the distance LRS between the laser device 102 and the execution height display device 104 is smaller in the state of FIG. 6 than the state of FIG. 7. More particularly, as the distance LRS between the laser device 102 and the execution height display device 104 gets smaller, the time for which the light receiving section 112 outputs the signal increases.

The structure and function of the laser beam sensing circuit 212 will not be described.

Figure 8:
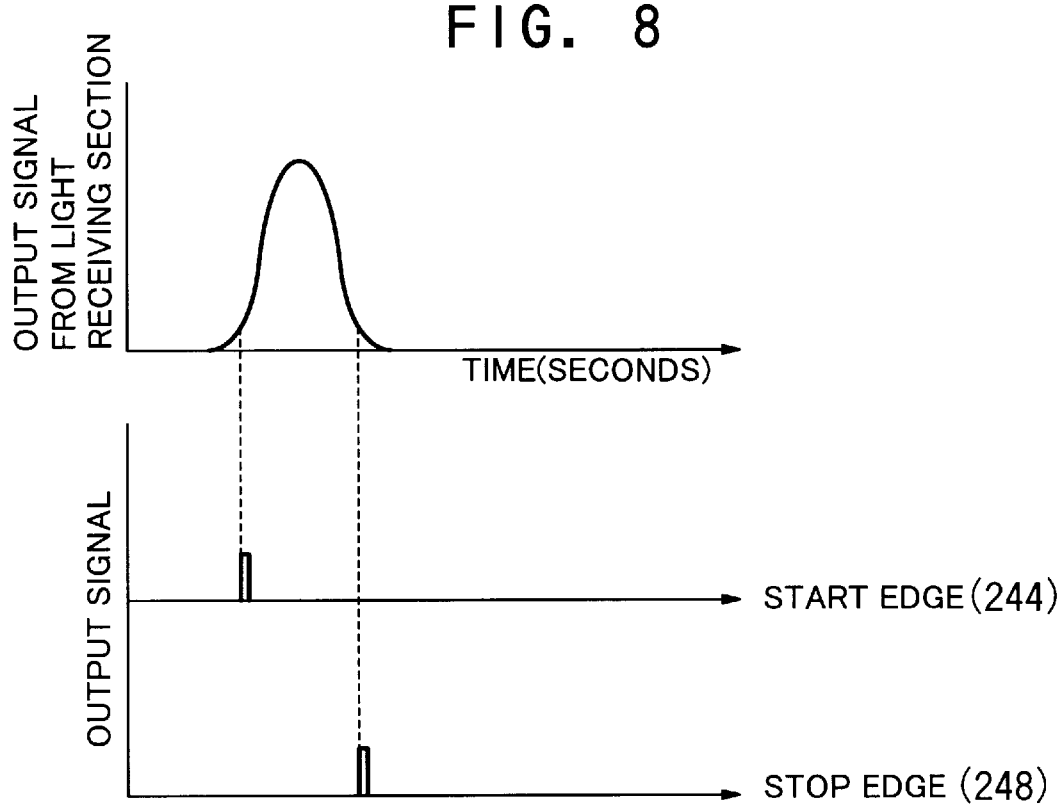
FIG. 8 is a view illustrating the relationship between the output signal from the light receiving section of the execution height display device according to the first embodiment of the present invention and the start and stop edges.
Figure 9:
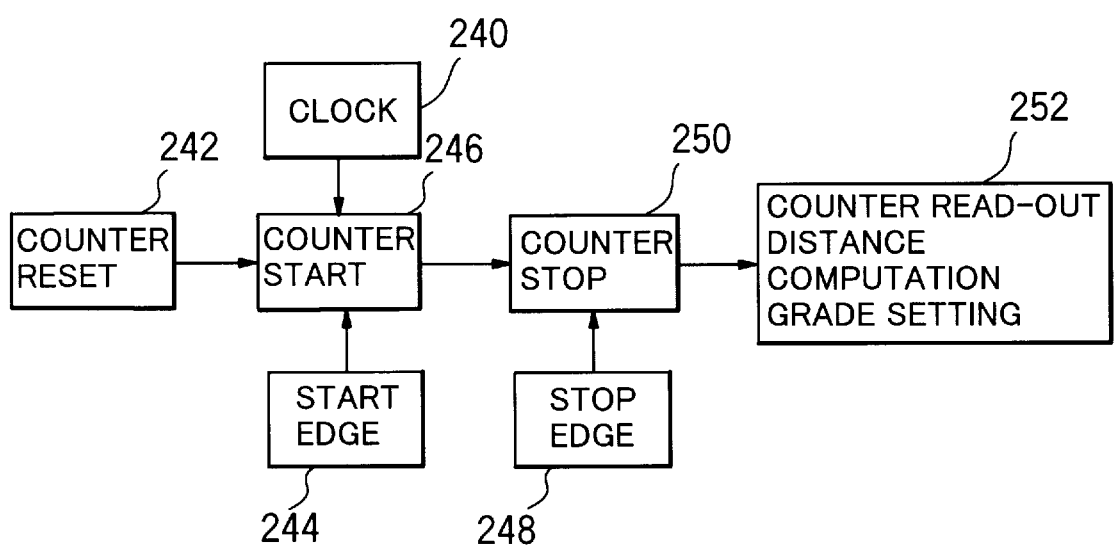
FIG. 9 is a view illustrating the operation of the laser beam sensing circuit in the execution height display device according to the first embodiment of the present invention.

Referring to FIGS. 8 and 9, it is now assumed, for example, that a clock signal of 10 MHz is to be supplied to a counter from a crystal oscillator (not shown) (Step 240). The counter is first reset (Step 242). As the output signal from the light receiving section 112 exceeds a threshold level, a start edge is generated (Step 244). This starts the counter (Step 246). As the output signal from the light receiving section 112 gets smaller than the threshold value, a stop edge is generated (Step 248), thereby stopping the operation of the counter (Step 250). Thus, the counter counts the clocks provided from the start edge to the stop edge.

In the subsequent step, the counts of clocks are read out from the counter. Based on the read counts, the distance LRS between the laser device 102 and the execution height display device 104 is calculated to set the grade (Step 252).

A procedure of setting the grade will now be described.

If it is now assumed that the flux diameter of the laser beam LB is d [mm], the width of the light receiving section 112 is w [mm], the number of revolutions in the laser beam LB emitted from the laser device 102 is RLB [rpm] and the distance between the laser device 102 and the execution height display device 104 is LRS [mm], time Sr (seconds) for which the luminous flux of the laser beam LB moves across the light receiving section 112 is:

$$Sr = (d+w)/(2\pi \times LRS \times RLB/60) \qquad (1).$$

Thus, $$LRS = (d+w)/(2\pi \times RLB \times Sr/60) \qquad (2).$$

Referring again to FIG. 4, the distance calculating formula storage circuit 214 has stored the second distance calculating formula (2).

In this case, the flux diameter d [mm] of the laser beam LB, the width w [mm] of the light receiving section 112 and the number of revolutions RLB [rpm] in the laser beam LB emitted from the laser device 102 may previously be stored in the distance calculating formula storage circuit 214 of the execution height display device 104. Alternatively, the operator may use the display mode selection switch 160 and the first and second input switches 162, 164 to input these values which are in turn stored in the distance calculating formula storage circuit 214.

The distance computing circuit 216 receives the output signal from the laser beam sensing circuit 212 and uses the distance calculating formula (2) stored in the distance calculating formula storage circuit 214 to calculate the distance LRS between the laser device 102 and the execution height display device 104.

If it is assumed that the desired grade is SLA [%], the execution height HIG [mm] is determined by:

$$HIG = SLA \times LRS/100 \qquad (3).$$

The height computing circuit 224 computes the execution height HIG according to the formula (3) based on the grade SLA stored in the grade storage circuit 220 as well as the distance LRS outputted from the distance computing circuit 216.

The height display section 226 displays the result of the computed execution height HIG when the height display section 226 receives the output signal from the height computing circuit 224.

If the laser beam LB emitted from the laser device 102 has a laser beam gradient SLL [°], the laser beam gradient SLL inputted from the laser beam gradient input member 230 has been stored in the laser beam gradient storage circuit 232.

The height computing circuit 224 computes the execution height HIG according to the following formula (4) based on the grade SLA stored in the grade storage circuit 220, the laser beam gradient SLL stored in the laser beam gradient storage circuit 232 and the distance LRS outputted from the distance computing circuit 216:

$$HIG = SLA \times LRS/100 - LRS \times \tan(SLL) \qquad (4).$$

Figure 10:
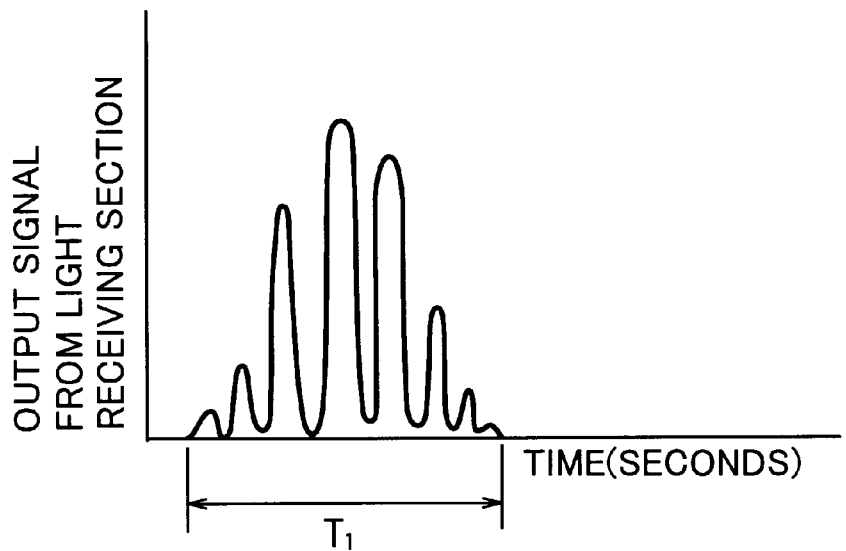
FIG. 10 is a view showing the output signal from the light receiving section of the execution height display device according to the first embodiment of the present invention when the laser beam emitted from the laser device has been modulated.
Figure 11:
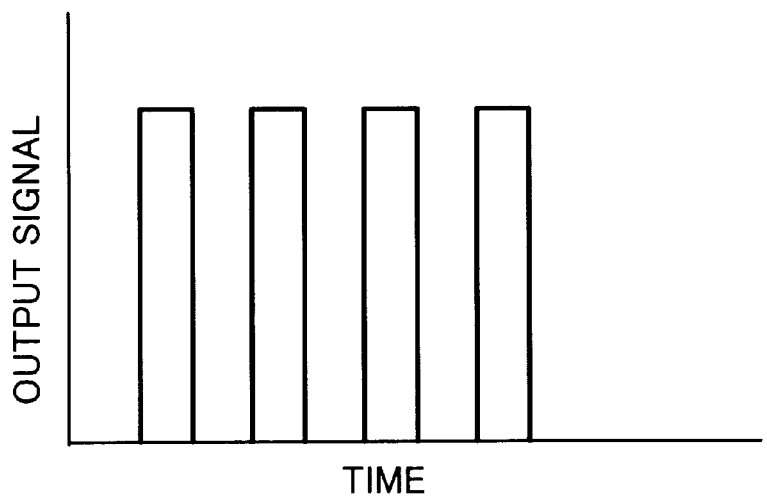
FIG. 11 is a view showing the shaped pulse signal in the execution height display device according to the first embodiment of the present invention when the laser beam emitted from the laser device has been modulated.

If the laser beam LB emitted from the laser device 102 has been modulated, it is now assumed that the modulation frequency of the laser beam LB is FLA [Hz]. In such a case, the output signal from the light receiving section 112 is as shown in FIG. 10. The laser beam sensing circuit 212 receives the output signal of the light receiving section 112 and shapes the pulse waveform thereof through a pulse shaping circuit (not shown) to provide such a pulse waveform as shown in FIG. 11. The shaping of pulse waveform may be made by a limitter. The distance computing circuit 216 counts the number of shaped pulse waveforms.

It is now assumed, for example, that the flux diameter of the laser beam LB is d=20 [mm], the width of the light receiving section 112 is w=5 [mm], the number of revolutions in the laser beam LB emitted from the laser device 102 is RLB=600 [rpm] and the modulation frequency of the laser beam LB is FLA=10 [MHz].

If the distance LRS between the laser device 102 and the execution height display device 104 is equal to 50000 [mm], time Sr [seconds] for which the luminous flux of the laser beam LB moves across the light receiving section 112 becomes 7.96 [microseconds]. At this time, the number of pulses in the laser beam LB received by the light receiving section 112 is equal to 80.

If the distance LRS between the laser device 102 and the execution height display device 104 is equal to 10000 [mm], time Sr [seconds] for which the luminous flux of the laser beam LB moves across the light receiving section 112 becomes 3.98 [microseconds]. At this time, the number of pulses in the laser beam LB received by the light receiving section 112 is equal to 40.

(2) Second Embodiment

Figure 12:
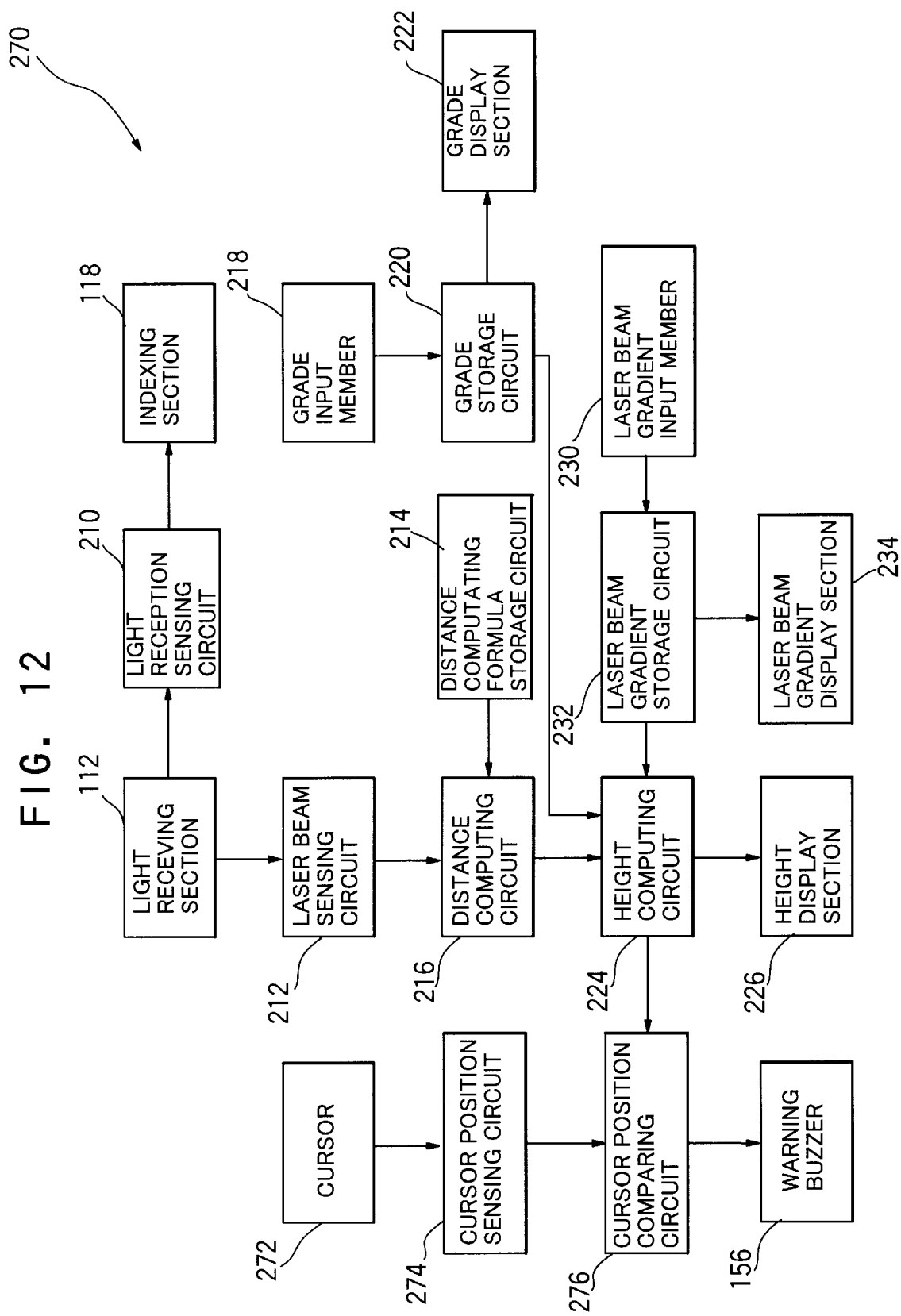
FIG. 12 is a block diagram of an execution height display device constructed according to the second embodiment of the present invention.

An execution height display device 270 constructed according to the second embodiment of the present invention comprises a cursor 272 having a notch 140 and a cursor position sensing circuit 274 for sensing the position of the cursor 272, as shown in FIG. 12. The cursor 272 is slidably mounted on the main body of the execution height display device 270. A cursor position comparing circuit 276 compares the output signal of the cursor position sensing circuit 274 with the output signal from the height computing circuit 224. If the position of the slidably moved cursor 272 is aligned with the execution height or within a preset range of allowable error, the cursor position comparing circuit 276 outputs a signal for driving the warning buzzer 156. The warning buzzer 156 is responsive to the buzzer drive signal from the cursor position comparing circuit 276 to inform the operator of that the position of the cursor 272 is appropriate.

Figure 13:
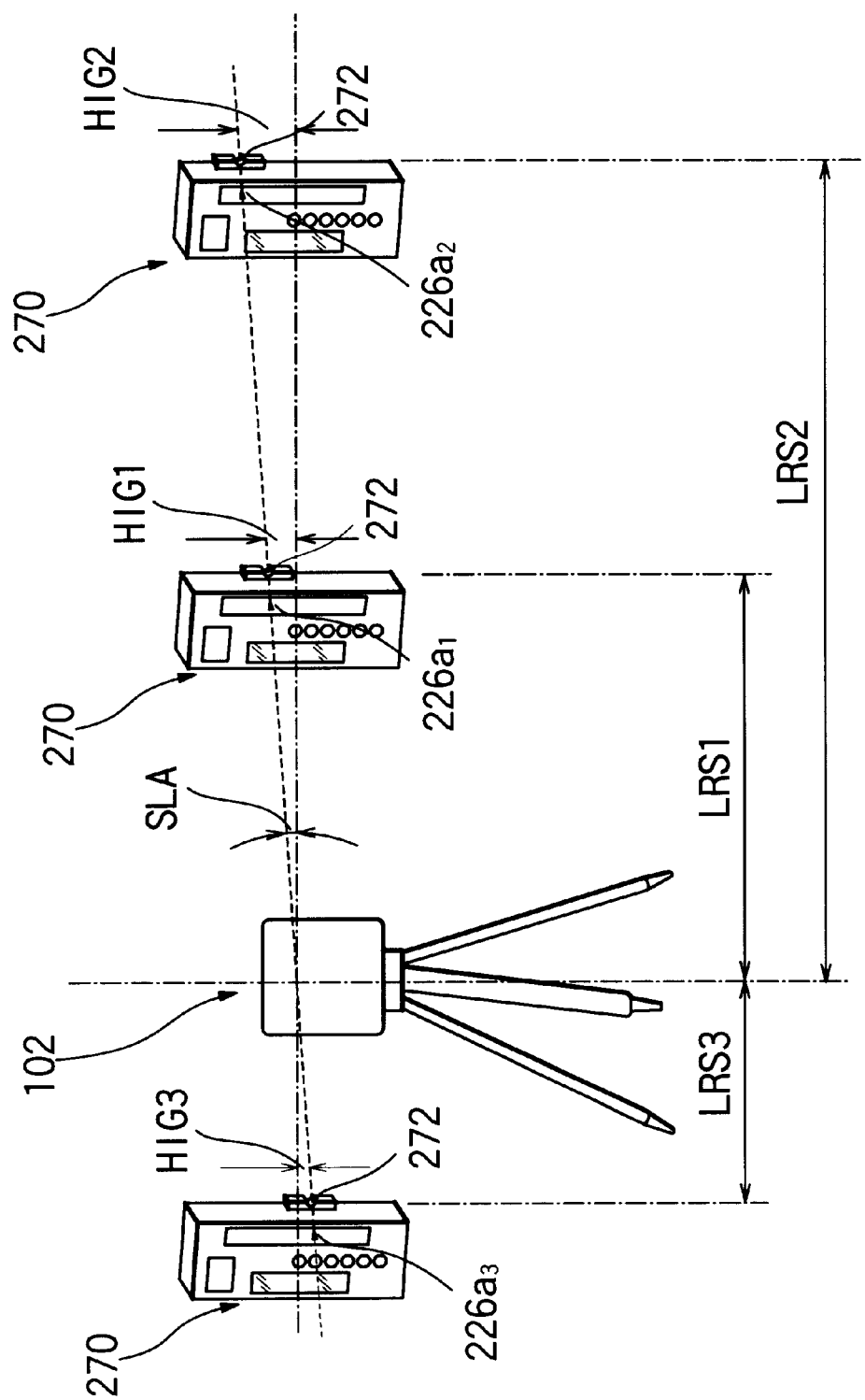
FIG. 13 is a view illustrating such a state that the execution height display device according to the second embodiment of the present invention displays a height.

Referring to FIG. 13, if the desired grade is SLA, the execution height setting system 270 calculates the distance LRS between the laser device 102 and the execution height display device 270, the result being then used to compute the execution height HIG. For example, the height display section 226 in the execution height display device 270 displays a height indication $226a_1$, when the execution height display device 270 is at a position spaced apart from the laser device 102 by a distance LRS1. The height display section 226 displays a height indication $226a_2$ when the execution height display device 270 is at a position spaced apart from the laser device 102 by a distance LRS2. If the desired grade is SLA and when such a value is negative, the height display device 226 displays a height indication 226$a_3$ when the execution height display device 270 is at a position spaced apart from the laser device 102 by the distance LRS2.

The operator slidably moves the cursor 272 in the execution height display device 270 to the height indication 226$a_1$, 226$a_2$ or 226$a_3$ indicated by the height display section 226. The operator then uses the notch 140 in the cursor 272 to execute the building or the like.

The remaining parts of the execution height display device 270 constructed according to the second embodiment of the present invention are similar to those of the execution height setting system 100 constructed according to the first embodiment of the present invention.

Figure 14:
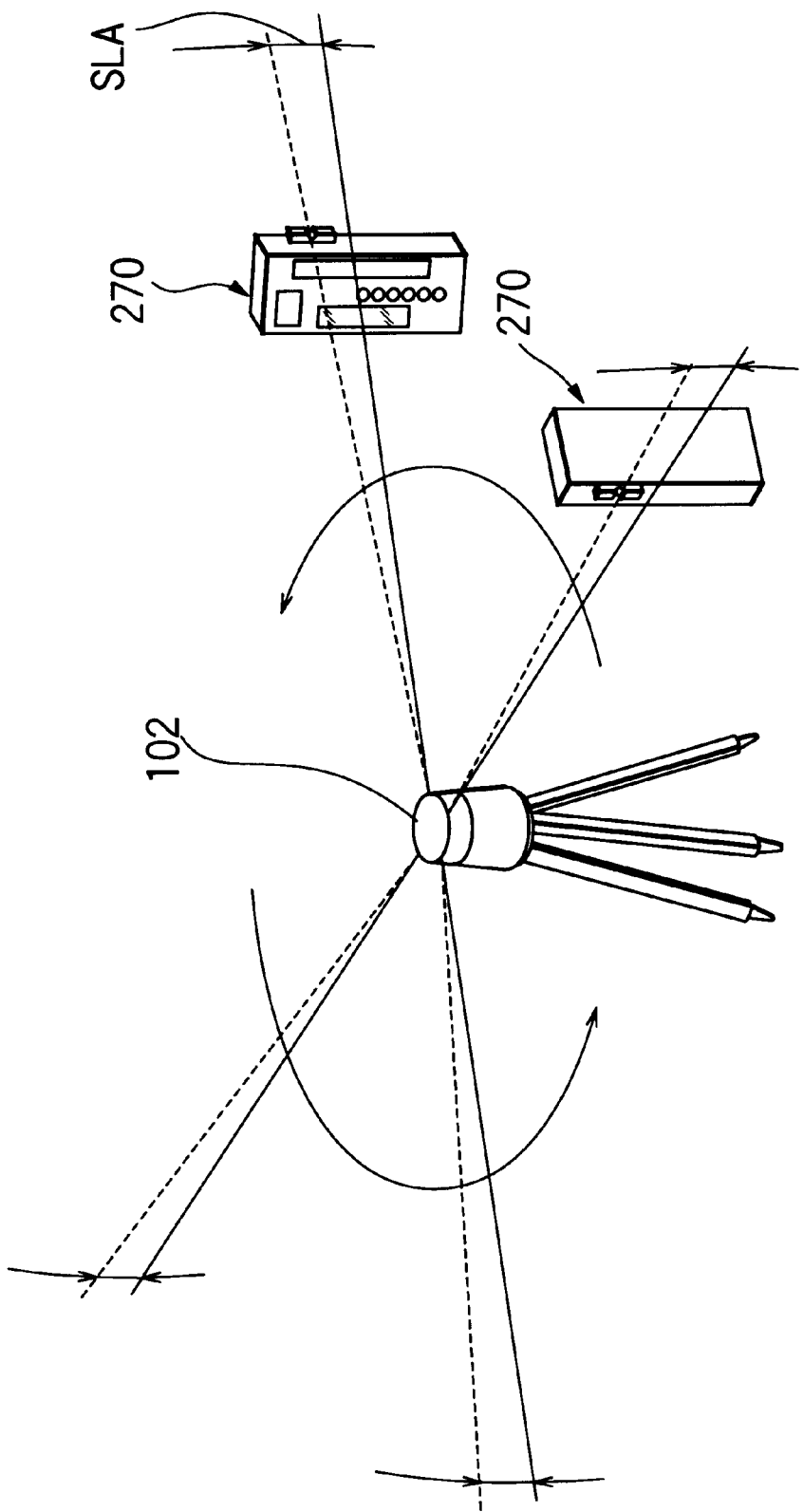
FIG. 14 is a view illustrating the execution height display device according to the second embodiment of the present invention when it sets a conical grade.

When the execution height setting system 270 or 100 of the present invention is used, the laser beam may be emitted from the laser device 102 along the entire circumference thereof to set a conical grade SLA about the laser device 102, as shown in FIG. 14.

Figure 15:
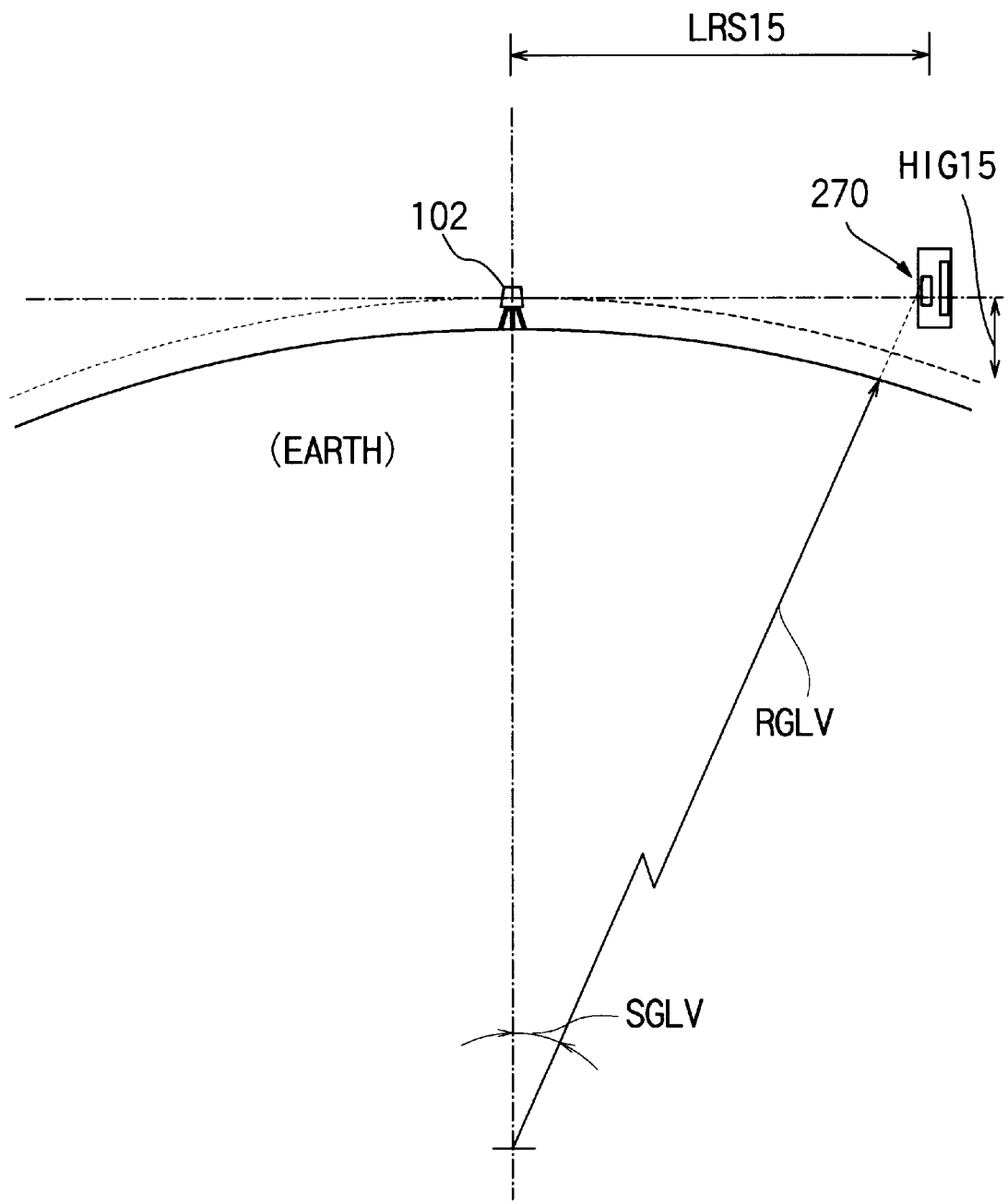
FIG. 15 is a view illustrating the execution height display device according to the second embodiment of the present invention when it corrects the spherical error in the earth.
Figure 16:
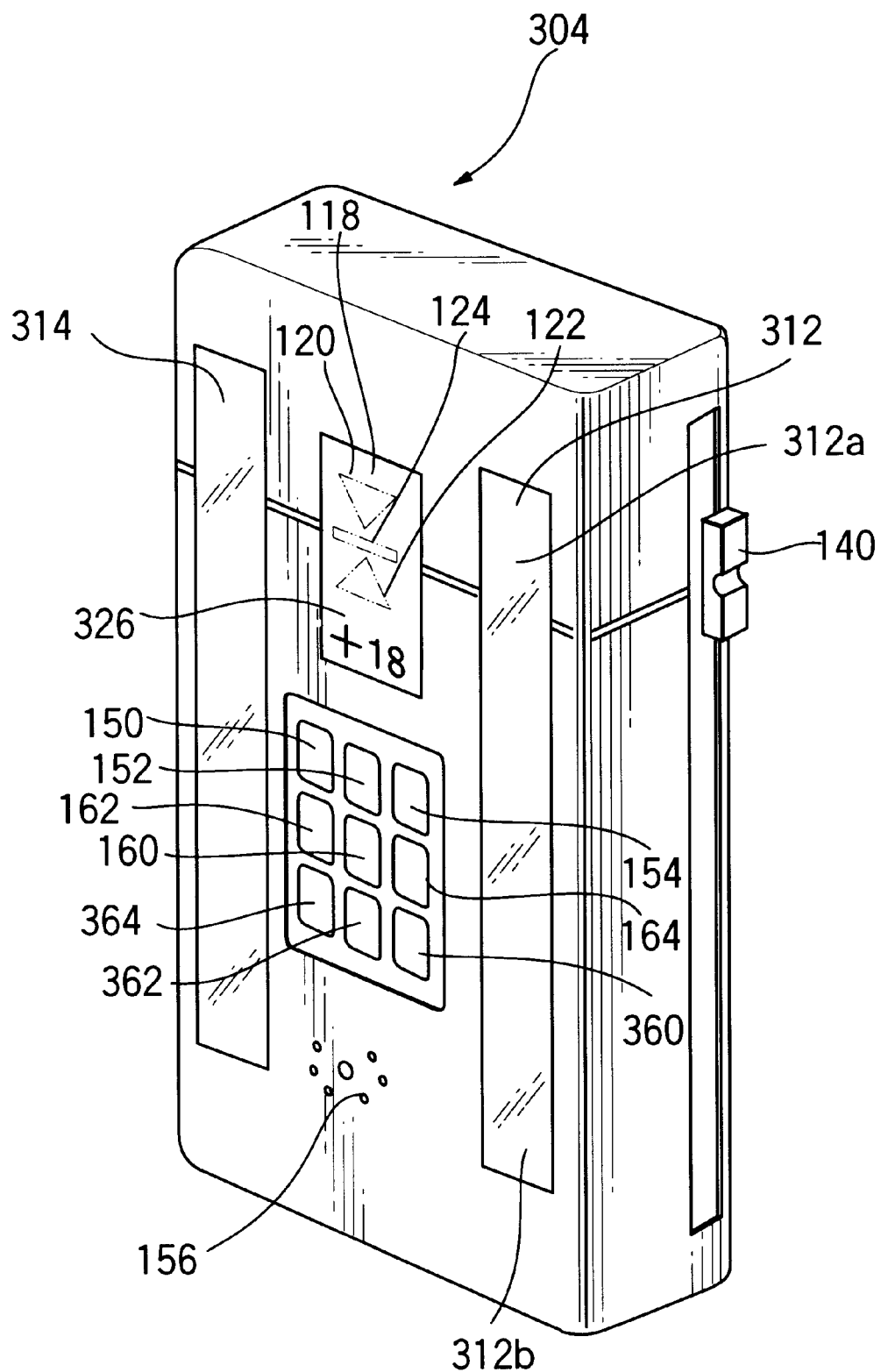
FIG. 16 is a perspective view of an execution height display device constructed according to the third embodiment of the present invention.

As shown in FIG. 15, further, a spherical error correcting formula may previously be inputted into the execution height display device 270 to correct a spherical error in the earth.

It is now assumed that the radius of the earth is RGLV; the distance between the laser device 102 and the execution height display device 270 is LRS15; the angle of the execution height display device 270 and laser device 102 relative to the center of the earth is SGLV; and a correction when the execution height display device 270 is at a position spaced apart from the laser device 102 by the distance LRS15 is HIG15.

$$\tan(SGLV) = LRS15/RGLV \quad (5)$$

and $$\tan(SGLV) = HIG15/LRS15 \quad (6).$$

Thus, $$HIG15 = (LRS15)^2/RGLV \quad (7).$$

When the formula (7) has been inputted into the distance calculating formula storage circuit 214, the distance computing circuit 216 can compute the distance between the execution height display device 270 and the laser device 102 as well as the correction HIG15, all the results of which are in turn outputted toward the height computing circuit 224. The height computing circuit 224 then computes the execution height, from the result of which the correction HIG 15 is corrected. The corrected result is displayed on the height display section 226.

(3) Third Embodiment

A execution height display device 304 constructed according to the third embodiment of the present invention comprises first and second light receiving sections 312, 314 disposed perpendicular to the laser beam LB, an indexing section 118 for indicating a shift of the detected laser beam LB relative to the reference position, a notch 140 formed relative to the indexing section 118, and a data display section 326 for displaying the inputted grade or execution height. The indexing section 118 and data display section 326 are formed by liquid crystal panels.

The first and second light receiving sections 312, 314 are formed by position sensors such as CCD's, PSD's or the like. At least one of the light receiving sections (e.g., first light receiving section 312) is divided into two parts, that is, an upper and lower light receiving portions 312$a$, 312$b$. When the laser beam LB from the rotary laser device scans the mid area between the two divided light receiving portions 312$a$ and 312$b$ in the first light receiving section 312, it will take the reference position. This will display a reference position indicating part 124 in the indexing section 118.

When the laser beam LB scans the upper light receiving portion 312$a$ in the first light receiving section 312, an upward indicating part 122 is displayed on the indexing section 118 to instruct that the main body should upwardly be moved to take the reference position. When the laser beam LB scans the lower light receiving portion 312$b$ of the first light receiving section 312, similarly, a downward indicating part 120 is displayed on the indexing section 118 to point that the main body should downwardly be moved to take the reference position.

The execution height display device 304 comprises a power switch 150, a detection precision adjusting button 152, a warning buzzer on/off button 154, a warning buzzer 156, a display mode selection switch 160, first and second input switches 162, 164, and mode setting switches 360, 362 and 364. When the mode setting switches 360, 362 and 364 are actuated, a display or data input mode can be set. For example, the mode setting switch 360 may be structured to match it with the input of grade; the mode setting switch 362 may be structured to match it with the input of laser beam gradient; and the mode setting switch 364 may be structured to match it with the input of spherical error correction in the earth.

Figure 17:
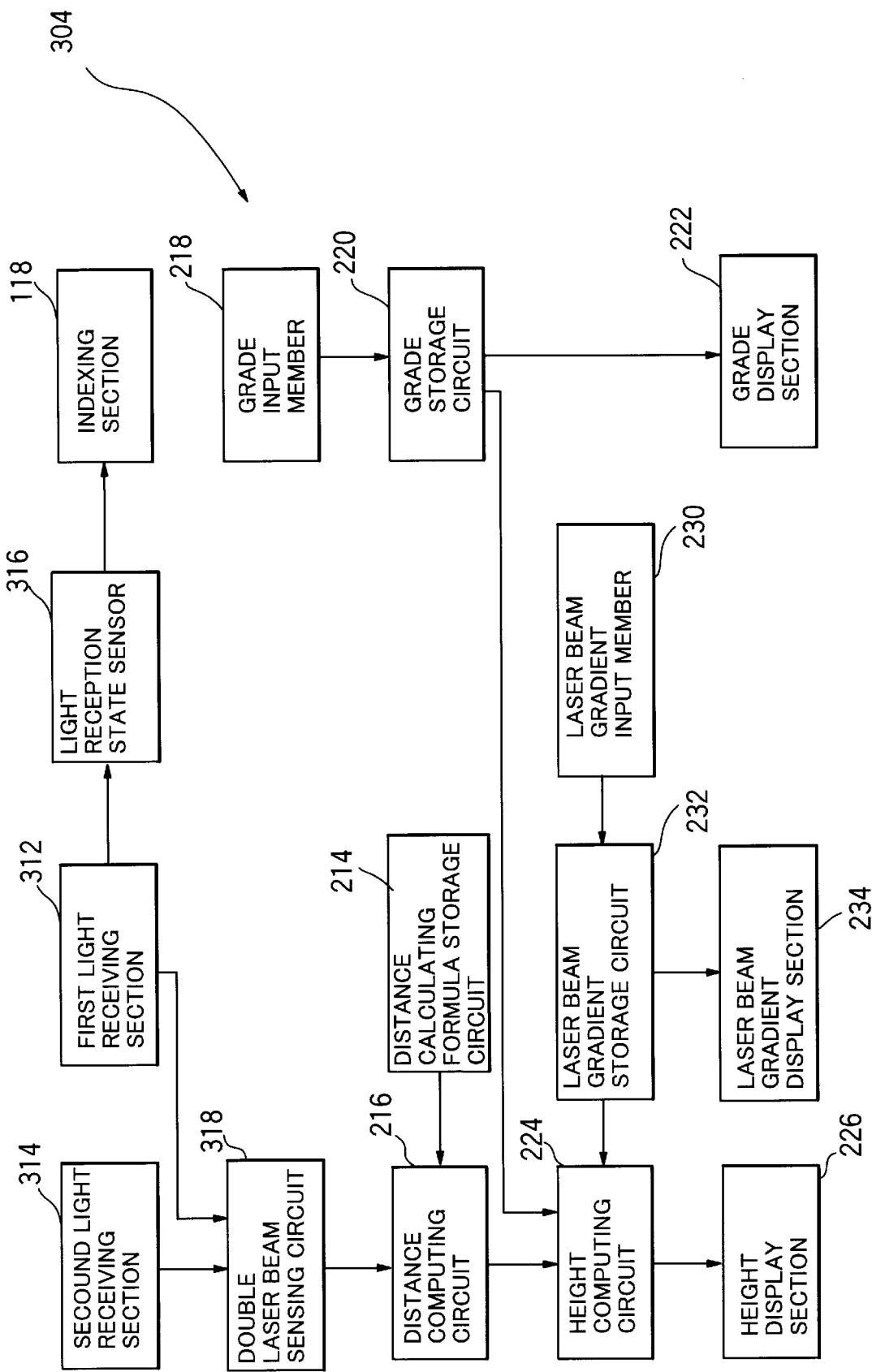
FIG. 17 is a block diagram of the execution height display device according to the third embodiment of the present invention.

As shown in FIG. 17, the execution height display device 304 comprises a light reception state sensing circuit 316 for sensing the state of the laser beam LB received by the first light receiving section 312, an indexing section 118 for indicating the result of the sensed laser beam LB, a double laser-beam sensing circuit 318 for sensing two laser beams received by the first and second light receiving sections 312, 314, a distance calculating formula storage circuit 214 previously stored a distance calculating formula for determining the distance LRS between the laser device 102 and the execution height display device 304, a distance computing circuit 216 for determining the distance LRS between the laser device 102 and the execution height display device 304 according to the distance calculating formula stored in the distance calculating formula storage circuit 214, based on the output signals from the double laser-beam sensing circuit 318, a grade input member 218 for inputting a grade required by the execution, a grade storage circuit 220 for storing the inputted grade based on the output signal from the grade input member 218, a slop display section 222 for displaying the content of grade stored in the grade storage circuit 220, a height computing circuit 224 for computing the height of a building or the like to be executed based on the output signal from the distance computing circuit 216 and also the content of grade stored in the grade storage circuit 220, and a height display section 226 for displaying the height of the building or the like to be executed based on the output signal form the height computing circuit 224.

Figure 18:
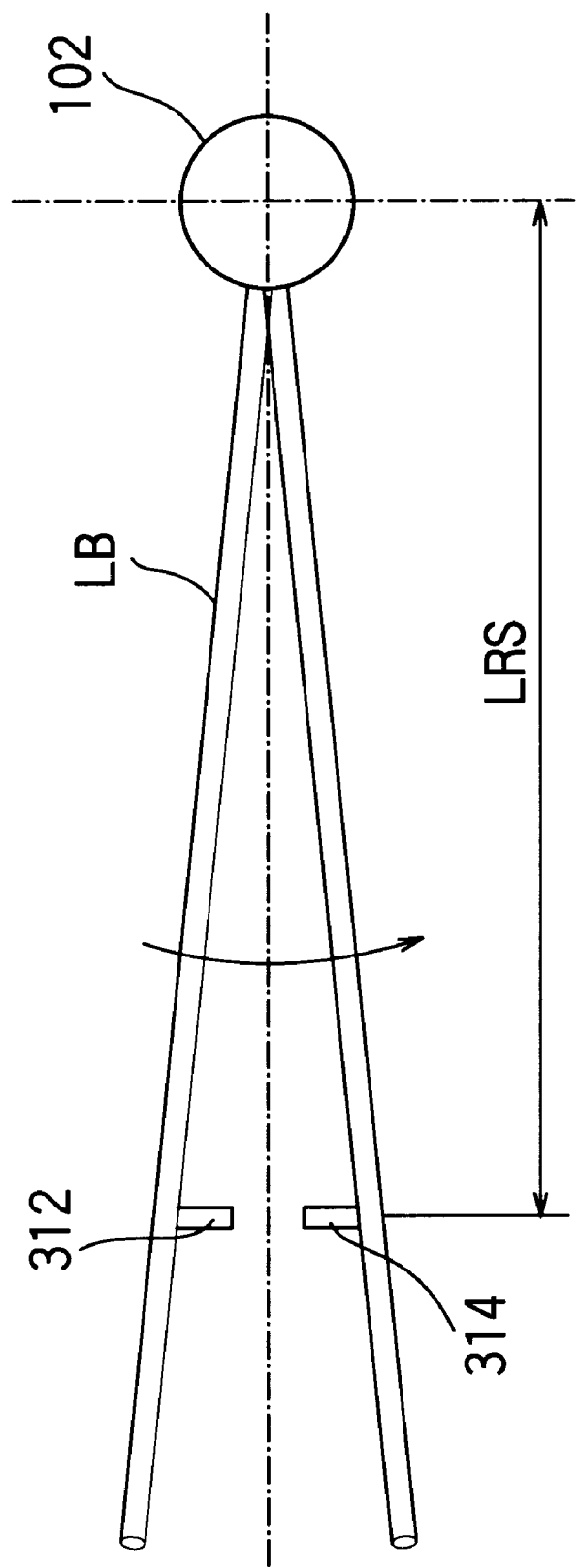
FIG. 18 is a view illustrating such a state that in the third embodiment, the laser beam emitted from the laser device radiates the light receiving section.

In order to determine the distance LRS between the laser device 102 and the execution height display device 304, as shown in FIG. 18, the laser beam LB rotatably emitted from the laser device 102 is sensed by the first and second light receiving portions 312, 314 in the first light receiving section 312 of the execution height display device 304. These sensed laser beams are then used to compute and determine the distance LRS between the laser device 102 and the execution height display device 304 based on the rotational speed of the laser beam LB, the diameter of the laser beam LB, the distance LELE between the first and second light receiving sections 312, 314 and time T1 for which the laser beam LB moves across the first and second light receiving sections 312, 314.

A procedure of measuring time intervals for which the laser beam LB is received by the first and second light receiving sections 312, 314 through the double laser-beam sensing circuit 318 will now be described.

The laser beam LB emitted from the laser device 102 is maintained constant in revolution, with the diameter thereof being also adjusted to be constant. However, the present invention may similarly be applied to a laser beam having its divergent angle. The widths of the first and second light receiving sections 312, 314 relative to the direction of the rotating laser beam LB is also predetermined.

Figure 19:
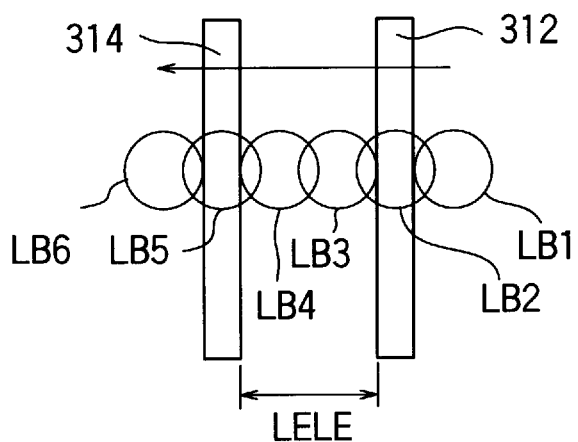
FIG. 19 is a side view of the execution height display device according to the third embodiment of the present invention, illustrating the luminous flux of the laser beam across the light receiving section.

Referring to FIG. 19, the laser beam LB moving across the first light receiving section 312 in the direction as shown by arrow first enters the first light receiving section 312 in a state LB1, radiates the central and horizontal portion of the first light receiving section 312 in another state LB2 and terminates the entry thereof onto the first light receiving section 312 in still another state LB3. Furthermore, the laser beam LB moving across the second light receiving section 314 in the direction as shown by arrow first enters the second light receiving section 314 in a state LB4, radiates the central and horizontal portion of the second light receiving section 314 in another state LB5 and terminates the entry thereof onto the second light receiving section 314 in still another state LB6.

Figure 20:
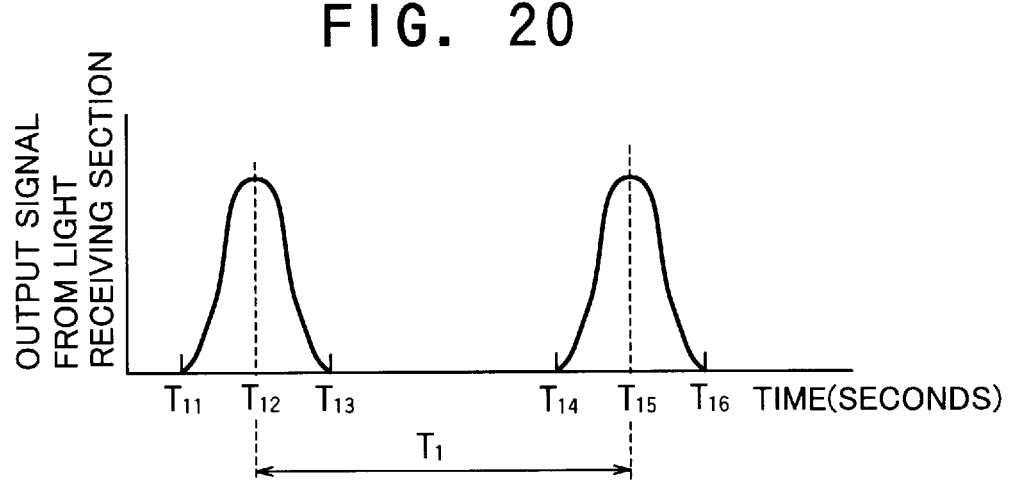
FIG. 20 is a view illustrating the output signal of the light receiving section in the execution height display device according to the third embodiment of the present invention.

Referring now to FIG. 20, the first light receiving section 312 received the laser beam LB initiates to output a signal at time $T_{11}$, makes the output thereof maximum at time $T_{12}$ and terminates the output thereof at time $T_{13}$. The second light receiving section 314 received the laser beam LB initiates to output a signal at time $T_{14}$, makes the output thereof maximum at time $T_{15}$ and terminates the output thereof at time $T_{16}$. The time interval $T_1$ between these times $T_{12}$ and $T_{15}$ will be measured.

Figure 21:
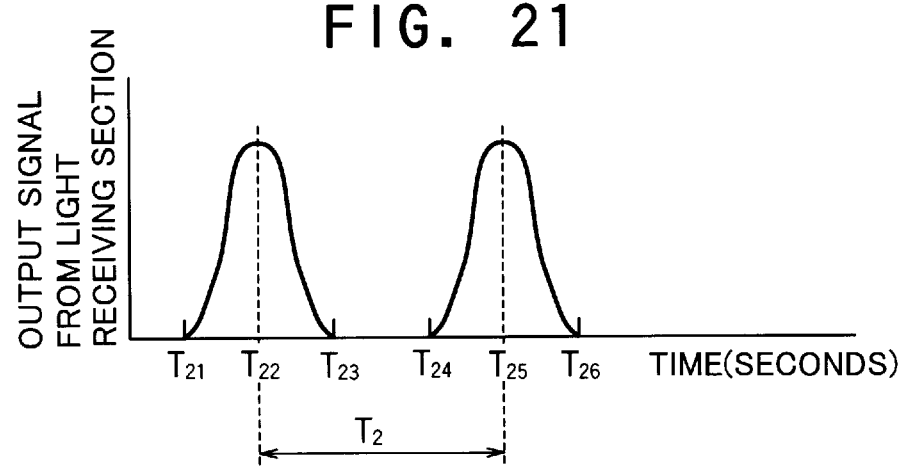
FIG. 21 is a view illustrating the output signal of the light receiving section in the execution height display device according to the third embodiment of the present invention.

Referring to FIG. 21, similarly, the first light receiving section 312 received the laser beam LB initiates to output a signal at time $T_{21}$, makes the output thereof maximum at time $T_{22}$ and terminates the output thereof at time $T_{23}$. The second light receiving section 314 received the laser beam LB initiates to output a signal at time $T_{24}$, makes the output thereof maximum at time $T_{25}$ and terminates the output thereof at time $T_{26}$. The time interval $T_2$ between these times $T_{22}$ and $T_{25}$ will be measured.

When $T_1$ is larger than $T_2$, it means that the distance LRS between the laser device 102 and the execution height display device 304 is smaller in the state of FIG. 20 than the state of FIG. 21. More particularly, as the distance LRS between the laser device 102 and the execution height display device 304 gets smaller, the time interval for which the output signal of the second light receiving section 314 becomes maximum decreases.

The double laser-beam sensing circuit 318 includes a counter for counting the time interval $T_1$ between the times $T_{12}$ and $T_{15}$.

In the subsequent step, the counter is read out so that the distance LRS between the laser device 102 and the execution height display device 304 will be calculated to set the grade.

A procedure of setting the grade will now be described.

It is now assumed that the flux diameter of the laser beam LB is d [mm]; the widths of the first and second light receiving sections 312, 314 are w [mm]; the distance between the first and second light receiving sections 312, 314 is LELE [mm]; the number of revolutions in the laser beam LB emitted from the laser device 102 is RLB [rpm] and the distance LRS between the laser device 102 and the execution height display device 304 is LRS.

Time Sd [seconds] for which the luminous flux of the laser beam LB moves from the center of the first light receiving section 312 to the center of the second light receiving section 314 is:

$$Sd=(LELE+w)/(2\pi \times LRS \times RLB/60) \tag{8}$$

Thus, $$LRS=(LELE+w)/(2\pi \times RLB \times Sr/60) \tag{9}$$

Referring again to FIG. 17, the distance calculating formula storage circuit 214 has stored such a distance calculating formula (9).

In such a case, the flux diameter d [mm] of the laser beam LB, the width w [mm] of the first and second light receiving sections 312, 314 and the number of revolutions RLB [rpm] in the laser beam LB emitted from the laser device 102 may previously be stored in the distance calculating formula storage circuit 214 of the execution height display device 304. Alternatively, the display mode selection switch 160 and the first and second input switches 162, 164 may be used by the operator to input the aforementioned values which are in turn stored in the distance calculating formula storage circuit 214.

When the distance computing circuit 216 receives the output signal from the double laser beam sensing circuit 318, the former uses the distance calculating formula (9) stored in the distance calculating formula storage circuit 214 to compute the distance LRS between the laser device 102 and the execution height display device 304.

The height computing circuit 224 uses the grade SLA stored in the grade storage circuit 220 as well as the distance LRS outputted from the distance computing circuit 216 to compute the execution height HIG according to the formula (3). The height display section 226 receives the output signal of the height computing circuit 224 and displays the computation result for the execution height HIG. (4) Concrete structure and function of the execution height display device according to the present invention As shown in FIG. 22, the execution height display device of the present invention comprises a power source 604 such as a battery or the like, a source of oscillation 606 such as a crystal oscillator or the like, a single CCD 608 or two CCD's 608 and 606 (two shown in this figure) for receiving the laser beam, a ROM 610 previously stored a processing program, one or more switches 621–626 used to input the necessary data, a RAM 630 for storing the input data from these switches, a CPU 650 for starting the processing program stored in the ROM 610 and for counting, computing and comparing the data stored in the ROM 610 and RAM 630, a warning buzzer 656 for generating a warning sound and an LCD panel 660 for displaying the input and computation results of the data.

As the switch 621 is turned on, the execution height display device is placed in its actuating state. When the CCD 608 or 609 receives the laser beam, the CPU 650 computes the distance between the laser device and the execution height display device according to the distance calculating formula stored in the ROM 610 and using the grade data stored in the RAM 630 to compute the desired height. The computed height is displayed on the LCD panel 660.

If necessary, the CPU 650 may compute the distance between the laser device and the execution height display device and thus the desired height according to the distance calculating formula stored in the ROM 610 and using the grade data, laser beam gradient data, cursor position data and other data stored in the RAM 630.

If necessary, furthermore, the LCD panel 660 may be used to display the grade data, laser beam gradient data and other input data.

The switches 621–626 may be any one of various switches such as rubber switches, membrane switches, touch switches and so on. Furthermore, the system may include a ten-key board.

The LCD panel 660 may be replaced by a fluorescent tube, LED or the like.

The power source 604 is preferably in the form of a lithium battery or silver battery.

According to the present invention, the following advantages can be provided:

(1) The execution of grade does not require any survey using a surveying machine such as level, transit or the like.

(2) The structure of the laser emitting device can be simplified.

(3) For various different directions and distances relative to the reference position, the execution of grade can be performed with improved accuracy.

What is claimed is:

1. An execution height setting system comprising:

a laser device for rotatably radiating a reference plane with a laser beam;

a light receiving section for receiving the laser beam radiated from said laser device;

a distance computing circuit for computing the distance between said laser device and said light receiving section based on the output signal from said light receiving section;

grade setting input means for inputting a grade relative to said laser beam radiated from said laser device;

a height computing circuit for computing a height from said laser beam radiated from said laser device based on said grade inputted by said grade setting input means and the output signal from said distance computing circuit; and an execution height display device having a height display section for displaying said height from said laser beam radiated from said laser device based on the output signal from said height computing circuit.

2. An execution height setting system according to claim 1 wherein said laser device includes a laser beam modulating circuit for modulating said laser beam and wherein said execution height display device comprises a pulse counting circuit for counting the number of pulses in said laser beam based on the output signal from said light receiving section and a distance computing circuit for computing the distance between said light receiving section and said laser device based on the output signal from said pulse counting circuit.

3. An execution height setting system according to claim 2 wherein said execution height display device comprises a light reception time measuring circuit for measuring time for which said execution height display device has received said laser beam, based on the output signal from said light receiving section, and a distance computing circuit for computing the distance between said light receiving section and said laser device based on the output signal from said light reception time measuring circuit.

4. An execution height setting system according to claim 1 wherein said execution height display device comprises a light reception state display section for displaying a position at which said laser beam enters relative to the reference position of said light receiving section and an indexing section having an index representing a shift of said laser beam from the reference position.

5. An execution height setting system according to claim 1 wherein said execution height display device comprises a light reception state display section for displaying a position at which said laser beam enters relative to the reference position of said light receiving section, an indexing section having an index representing a position based on said reference position, said indexing section being slidably mounted on said execution height display device, and index sensing means for sensing a position into which said indexing section has slidably moved.

6. An execution height display device comprising:

a light receiving section for receiving a laser beam emitted from a source of laser beam;

a distance computing circuit for computing the distance between said source of laser beam and said light receiving section based on the output signal from said light receiving section;

grade setting input means for inputting a grade relative to said laser beam emitted from said source of laser beam;

a height computing circuit for computing a height from said laser beam emitted from said source of laser beam based on said grade inputted by said grade setting input means and the output signal from said distance computing circuit; and a height display section for displaying said height from said laser beam emitted from said source of laser beam based on the output signal from said height computing circuit.

7. An execution height display device according to claim 6, further comprising a pulse counting circuit for counting the number of pulses in said laser beam based on the output signal from said light receiving section, and a distance computing circuit for computing the distance between said source of laser beam and said light receiving section based on the output signal from said pulse counting circuit.

8. An execution height display device according to claim 6, further comprising a light reception time measuring circuit for measuring time for which said execution height display device has received said laser beam, based on the output signal from said light receiving section, and a distance computing circuit for computing the distance between said source of laser beam and said light receiving section based on the output signal from said light reception time measuring circuit.

9. An execution height display device according to claim 6, further comprising a light reception state display section for displaying a position at which said laser beam enters relative to the reference position of said light receiving section, and an indexing section having an index representing a shift of said laser beam from the reference position.

10. An execution height display device according to claim 6, further comprising a light reception state display section for displaying a position at which said laser beam enters relative to the reference position of said light receiving section, an indexing section having an index representing a position based on said reference position, said indexing section being slidably mounted on said execution height display device, and index sensing means for sensing a position into which said indexing section has slidably moved.

11. An execution height setting system comprising:
a laser device emitting a laser beam while rotating,
a light receiving section for receiving the laser beam emitted from said laser device,
a distance calculating formula storage circuit having a previously stored distance calculating formula for determining the distance between said laser device and said light receiving section,
a distance computing circuit for computing the distance between said laser device and said light receiving section according to the distance calculating formula stored in said distance calculating formula storage circuit and based on the output signal from said light receiving section,
a grade setting input member for inputting a grade relative to said laser beam emitted from said laser device,
a height computing circuit for computing a height from said laser beam emitted from said laser device based on said grade inputted by said grade setting input member as well as the output signal from said distance computing circuit, and
an execution height display device having a height display section for displaying said height from said laser beam emitted from said laser device based on the output signal from said height computing circuit.

12. An execution height setting system according to claim 11, further comprising a laser beam gradient input member for inputting the laser beam gradient, a laser beam gradient storage circuit for storing the value of the inputted laser beam gradient, and a laser beam gradient display section for displaying the laser beam gradient stored in the laser beam gradient storage circuit.

13. An execution height setting system according to claim 11, further comprising a laser beam sensing circuit for measuring time for which said laser beam enters said light receiving section, the resulting measurement being then outputted therefrom toward said distance computing circuit.

14. An execution height setting system according to claim 11 wherein said laser device includes a laser beam modulating circuit for modulating said laser beam and wherein said execution height display device comprises a pulse counting circuit for counting the number of pulses in said laser beam based on the output signal from said light receiving section and a distance computing circuit for computing the distance between said laser device and said light receiving section based on the output signal from said pulse counting circuit.

15. An execution height setting system according to claim 11, further comprising a cursor having a notch, said cursor being slidably mounted on the main body of said execution height setting system, a cursor position sensing circuit for sensing the position of said cursor, and a cursor position comparing circuit for comparing the output signal from said cursor position sensing circuit with the output signal from said height sensing circuit with the comparison result being then used to generate and output a signal for driving a warning buzzer.

16. An execution height setting system according to claim 11 wherein the distance calculating formula storage circuit has previously stored a correction formula for correcting the spherical error in the earth and wherein said distance computing circuit calculates the distance between the execution height display device and the laser device as well as the correction for correcting the spherical error in the earth, these calculation results being then outputted toward the height computing circuit which in turn calculates the height from said laser beam emitted from said laser device to be used for correcting the correction for the spherical error in the earth, the corrected result being then displayed on said height display section.

17. An execution height setting system comprising:
a laser device for emitting the luminous flux of a laser beam while rotating,
a light receiving section for receiving the laser beam emitted from said laser device,
first and second light receiving sections for receiving said laser beam,
a double laser-beam sensing circuit for sensing the laser beam received by said first and second light receiving sections,
a distance calculating formula storage circuit having a previously stored distance calculating formula for determining the distance between the laser device and the execution height display device,
a distance computing circuit for determining the distance between the laser device and the execution height display device according to the distance calculating formula stored in said distance calculating formula storage circuit and based on the output signal from said double laser-beam sensing circuit,
a grade input member for inputting a grade relative to said laser beam emitted from said laser device,
a grade storage circuit for storing said grade inputted by said grade input member based on the output signal from said grade input member,
a height computing circuit for computing the height of a building or the like to be executed based on the output signal from said distance computing circuit as well as the content of grade stored in said grade storage circuit, and
a height display section for displaying said height of the building or the like to be executed based on the output signal from said height computing circuit.

18. An execution height setting system according to claim 17, further comprising a light reception state sensing circuit for sensing the state of the laser beam received by at least one of said first and second light receiving sections and an indexing section for indicating the detection result of the laser beam.

19. An execution height setting system comprising:
a laser device for rotatably radiating a reference plane with a laser beam;
a light receiving section for receiving the laser beam radiated from said laser device;
a distance computing means for computing the distance between said laser device and said light receiving section based on the output signal from said light receiving section;
grade setting input means for inputting a grade relative to said laser beam radiated from said laser device;
a height computing means for computing a height from said laser beam radiated from said laser device based on said grade inputted by said grade setting input means and the output signal from said distance computing means; and
an execution height display device having a height display section for displaying said height from said laser beam radiated from said laser device based on the output signal from said height computing means.

20. An execution height setting system according to claim 19 wherein said laser device includes a laser beam modulating means for modulating said laser beam and wherein said execution height display device comprises a pulse counting means for counting the number of pulses in said laser beam based on the output signal from said light receiving section and a distance computing means for computing the distance between said light receiving section and said laser device based on the output signal from said pulse counting means.

21. An execution height setting system according to claim 20 wherein said execution height display device comprises a light reception time measuring means for measuring time for which said execution height display device has received said laser beam, based on the output signal from said light receiving section, and a distance computing means for computing the distance between said light receiving section and said laser device based on the output signal from said light reception time measuring means.

22. An execution height setting system according to claim 19 wherein said execution height display device comprises a light reception state display section for displaying a position at which said laser beam enters relative to the reference position of said light receiving section and an indexing section having an index representing a shift of said laser beam from the reference position.

23. An execution height setting system according to claim 19 wherein said execution height display device comprises a light reception state display section for displaying a position at which said laser beam enters relative to the reference position of said light receiving section, an indexing section having an index representing a position based on said reference position, said indexing section being slidably mounted on said execution height display device, and index sensing means for sensing a position into which said indexing section has slidably moved.

24. An execution height display device comprising:

a light receiving section for receiving a laser beam emitted from a source of laser beam;

a distance computing means for computing the distance between said source of laser beam and said light receiving section based on the output signal from said light receiving section;

grade setting input means for inputting a grade relative to said laser beam emitted from said source of laser beam;

a height computing means for computing a height from said laser beam emitted from said source of laser beam based on said grade inputted by said grade setting input means and the output signal from said distance computing means; and a height display section for displaying said height from said laser beam emitted from said source of laser beam based on the output signal from said height computing means.

25. An execution height display device according to claim 24, further comprising a pulse counting means for counting the number of pulses in said laser beam based on the output signal from said light receiving section, and a distance computing means for computing the distance between said source of laser beam and said light receiving section based on the output signal from said pulse counting means.

26. An execution height display device according to claim 25, further comprising a light reception time measuring means for measuring time for which said execution height display device has received said laser beam, based on the output signal from said light receiving section, and a distance computing means for computing the distance between said source of laser beam and said light receiving section based on the output signal from said light reception time measuring means.

27. An execution height display device according to claim 24, further comprising a light reception state display section for displaying a position at which said laser beam enters relative to the reference position of said light receiving section, and an indexing section having an index representing a shift of said laser beam from the reference position.

28. An execution height display device according to claim 24, further comprising a light reception state display section for displaying a position at which said laser beam enters relative to the reference position of said light receiving section, an indexing section having an index representing a position based on said reference position, said indexing section being slidably mounted on said execution height display device, and index sensing means for sensing a position into which said indexing section has slidably moved.

* * * * *